(12) United States Patent
Berhorst et al.

(10) Patent No.: US 8,847,737 B2
(45) Date of Patent: Sep. 30, 2014

(54) TRANSPONDER AND METHOD FOR WIRELESS DATA TRANSMISSION

(75) Inventors: Martin Berhorst, Heidelberg (DE); Alexander Kurz, Schwaebisch Hall (DE); Peter Schneider, Hassmersheim (DE)

(73) Assignee: Atmel Corporation, San Jose, CA (US)

( * ) Notice: Subject to any disclaimer, the term of this patent is extended or adjusted under 35 U.S.C. 154(b) by 777 days.

(21) Appl. No.: 13/037,509

(22) Filed: Mar. 1, 2011

(65) Prior Publication Data

US 2011/0177781 A1 Jul. 21, 2011

Related U.S. Application Data

(63) Continuation of application No. 11/705,009, filed on Feb. 12, 2007, now abandoned.

(30) Foreign Application Priority Data

Feb. 10, 2006 (DE) .......................... 10 2006 007 261

(51) Int. Cl.
*H04B 5/00* (2006.01)
*G06K 19/07* (2006.01)

(52) U.S. Cl.
CPC .................................. *G06K 19/0723* (2013.01)
USPC .................. 340/10.34; 340/572.1; 340/572.4; 340/10.1; 455/41.1; 455/41.2; 455/41.3

(58) Field of Classification Search
None
See application file for complete search history.

(56) References Cited

U.S. PATENT DOCUMENTS

| 5,287,112 | A | * | 2/1994 | Schuermann | 342/42 |
| 5,374,930 | A | * | 12/1994 | Schuermann | 342/42 |
| 5,541,604 | A | * | 7/1996 | Meier | 342/42 |
| 5,680,459 | A | * | 10/1997 | Hook et al. | 705/65 |
| 6,891,475 | B2 | * | 5/2005 | Bui et al. | 340/572.1 |
| 7,151,455 | B2 | | 12/2006 | Lindsay | |
| 7,218,204 | B2 | * | 5/2007 | Hayashi | 340/10.34 |

(Continued)

FOREIGN PATENT DOCUMENTS

| DE | 197 44 782 | 4/1999 |
| DE | 102 45 747 | 4/2004 |

(Continued)

OTHER PUBLICATIONS

Klaus Finkenzeller, "RFID Handbook," Fundamentals and Applications in Contactless Smart Cards and Identification, Second Edition, Chapter 3.2.1.2 (*Load Modulation* ), pp. 42-47.

*Primary Examiner* — Benjamin C Lee
*Assistant Examiner* — Rajsheed Black-Childress
(74) *Attorney, Agent, or Firm* — Baker Botts LLP

(57) ABSTRACT

A transponder and a method for wireless data transmission is provided. The transponder comprises an input circuit with input terminals for connecting an antenna coil for data transmission to a base station by means of inductive coupling, a first controllable switching means, at least one resistor, which is looped in series with the first controllable switching means between the input terminals of the input circuit, and a controller which is designed in such a way that it connects through the first switching means as soon as a voltage applied at the input terminals falls below a first settable threshold value, and again interrupts it as soon as the voltage applied at the input terminals for a settable duration is above the first settable threshold value and/or above a second settable threshold value.

20 Claims, 2 Drawing Sheets

(56) References Cited

U.S. PATENT DOCUMENTS

| | | | |
|---|---|---|---|
| 7,240,838 B2 | 7/2007 | Bui | |
| 2001/0038332 A1* | 11/2001 | Rodgers et al. | 340/572.1 |
| 2004/0217171 A1* | 11/2004 | deVos et al. | 235/451 |
| 2005/0083179 A1 | 4/2005 | Carrender | |
| 2006/0076837 A1 | 4/2006 | Gotoh | |
| 2008/0218314 A1* | 9/2008 | Van Eeden | 340/10.1 |
| 2009/0195366 A1* | 8/2009 | Meier et al. | 340/10.51 |
| 2010/0231362 A1* | 9/2010 | Smith et al. | 340/10.42 |

FOREIGN PATENT DOCUMENTS

| | | |
|---|---|---|
| DE | 10 2004 031 671 | 1/2006 |
| DE | 10 2005 032 590 | 2/2006 |
| EP | 0 732 663 | 9/1996 |
| EP | 0 829 940 | 3/1998 |
| FR | 2812142 | 5/2005 |
| WO | 02/09028 | 1/2002 |

* cited by examiner

TRANSPONDER AND METHOD FOR WIRELESS DATA TRANSMISSION

This nonprovisional application claims priority under 35 U.S.C. §119(a) on German Patent Application No. DE 102006007261, which was filed in Germany on Feb. 10, 2006, and which is herein incorporated by reference.

BACKGROUND OF THE INVENTION

1. Field of the Invention

The present invention relates to a transponder and a method for wireless data transmission.

2. Description of the Background Art

Contactless identification systems or radio-frequency-identification (RFID) systems typically include a base station, a reading device, or a reading unit and a plurality of transponders or remote sensors. The transponders or their transmitting and receiving devices typically do not have an active transmitter for data transmission to the base station. Such inactive systems are called passive systems when they do not have their own power supply, and semipassive systems when they have their own power supply. Passive transponders draw the power necessary for their supply from the electromagnetic field emitted by the base station.

For data transmission between the transponder and the base station, for example, for a programming operation of the transponder, the transponder has an interface of a specific interface type, which is compatible with the corresponding interface type of the base station. The interface types can be divided, in a preliminary rough grouping, into contact and contactless types.

The interface types with which the data transmission occurs contactless or contact-free differ, inter alia, in the operating or carrier frequency used for the data transmission, i.e., the frequency transmitted by the base station. Frequently used frequencies are, for example, 125 kHz (LF range), 13.56 MHz (RF range), a frequency range between 860 MHz to 960 MHz (UHF range), and a frequency range greater than 3 GHz (microwave range).

Another differentiating feature of the different interface types is the type of coupling between the specific interfaces of the transponder and the base station. In this case, inter alia, an inductive or magnetic coupling and a far-field coupling are differentiated. Described in simplified terms, in inductive or near-field coupling, an antenna coil of the base station and an antenna coil connected to the input circuit of the transponder form a transformer, which is why this type of coupling is also called a transformer coupling. In inductive coupling, a maximum distance between the transponder and the base station is limited to the near field of the employed antenna. The near-field range is substantially established by the operating frequency of the interface.

A modulation is usually used in inductive coupling for data transmission from a transponder to a base station; in this regard, see, for example, Finkenzeller, Chapter 3.2.1.2.1 "Load Modulation."

For data transmission from the base station to the transponder, the base station in inductive coupling usually transmits a carrier signal with a frequency in a frequency range of 50 kHz to 250 kHz. To begin the data transmission, the base station via amplitude modulation of the carrier signal first generates a short field gap or a so-called "gap"; i.e., the amplitude of the carrier signal is dampened or attenuated briefly, for example, for about 50 µs to 400 µs, or totally suppressed.

Characters which are transmitted subsequent to the initiation of the data transmission by the base station are encoded by associated durations between temporally successive field gaps. A first character value is hereby assigned a first duration and at least one second character value is assigned a second duration. To decode the transmitted characters, the transponder determines the specific durations between the field gaps and determines the value of the transmitted character from the determined duration.

For error-free data transmission or decoding of the characters, it is necessary that the signal courses generated by the base station and received by the transponder by inductive coupling have established maximum tolerances, for example, in regard to their time course and/or employed level.

To increase the achievable ranges between base station and passive transponders, the quality of a parallel resonant circuit, which is formed by the antenna coil and a capacitor connected parallel thereto, is increased in order to enable the supplying of the passive transponder from the field transmitted by the base station at greater distances as well. The reduced damping of the resonant circuit has the effect that at a field gap a coil voltage or a voltage of the parallel resonant circuit of the transponder declines more slowly than in the case of a resonant circuit with a lower quality and therefore higher damping. Because the field gap in the transponder can be detected, however, only when the coil voltage or a voltage obtained from the coil voltage by rectification has declined below a settable potential, field gaps can be detected in a delayed manner in comparison with a resonant circuit with a lower quality. This has the result that the durations of the field gaps detected in the transponder are shortened and the durations between the field gaps are lengthened. This change in the timing of the signal courses detected in the transponder is influenced directly by the quality of the resonant circuit. Because the timing must lie within predefined limit values, however, the signal transmitted by the base station should have a timing, which depends on the quality of the resonant circuit of the transponder, because otherwise transmission errors can arise.

SUMMARY OF THE INVENTION

It is therefore an object of the present invention to provide a transponder and a method for wireless data transmission, which enable a high transmission range between base station and transponder and a substantially quality-independent timing of the signals generated by the base station.

The transponder of the invention comprises an input circuit with input terminals for connecting an antenna coil and/or an LC resonant circuit for data transmission to a base station by means of inductive coupling, a first controllable switch, at least one resistor, which is looped in series with the first controllable switch between the input terminals of the input circuit, and a controller which is designed in such a way that it connects through the first switch as soon as or when a voltage applied at the input terminals falls below a first settable threshold value, and again interrupts it as soon as or when the voltage applied at the input terminals for a settable duration is above the first settable threshold value and/or above a second settable threshold value. The second settable threshold value is preferably greater than the first settable threshold value. The voltage applied at the input terminals can also be rectified for evaluating the signal level. The closed switch in conjunction with the resistor has the effect that the damping of the resonant circuit increases depending on a selected resistance value, as soon as a first field gap is detected. After the detection of the first field gap, this leads to a rapid, substantially quality-independent decline in the coil voltage in subsequently generated field gaps. At the end of the data transmission between the base station and the transponder, i.e., as soon as the voltage applied at the input terminals for the settable duration is above the first and/or above the second settable threshold value, the switch is interrupted, as a result of which the effective quality of the resonant circuit again increases considerably, as a result of which a high range is achievable. All in all, this means that despite high qualities of the resonant circuit a uniform timing of the signals received in the transponder or transmitted by the base station is achievable. In this way, it is possible to combine high transmission ranges and a quality-independent operation.

In an embodiment, the transponder can be passive. Particularly in passive transponders, considerable range improvements can be achieved with the method of the invention with simultaneous retention of the data transmission quality.

In a further embodiment, the switch can be a transistor, particularly a MOS transistor.

In a further embodiment, the input circuit can be designed to process frequencies within a frequency range of 50 kHz to 250 kHz, particularly 125 kHz.

In a further embodiment, the input circuit for the data transmission to the base station comprises a modulation unit with a controllable voltage limiting unit, which is designed in such a way that it limits the voltage applied at the input terminals to a first settable maximum value or to a second settable maximum value. The modulation unit is used in particular for load modulation. The voltage limiting unit contains circuit parts, which limit or clamp the voltage applied at the input terminals, as a function of the control state, to the first settable maximum value or to the second settable maximum value. Preferably, the second maximum value is smaller than the first maximum value and the voltage limiting unit is driven in such a way that it adjusts the second, i.e., smaller maximum value, when the first switch is switched through, and adjusts the first, i.e., higher maximum value, when the first switch is interrupted. Because of the resulting simultaneous voltage reduction, when the resistor is switched on to increase the damping, the duration is again reduced, which the coil voltage requires, in order to decline in the case of a field gap below the first threshold value for detecting the field gap.

In the method for wireless data transmission by means of inductive coupling between a base station and a transponder, which has an input circuit with input terminals for connecting an antenna coil and/or an LC resonant circuit, a resistive load between the input terminals is turned on as soon as a voltage applied at the input terminals falls below a first settable threshold value, and turns off again as soon as or when the voltage applied at the input terminals for a settable duration is above the first settable threshold value and/or above a second settable threshold value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
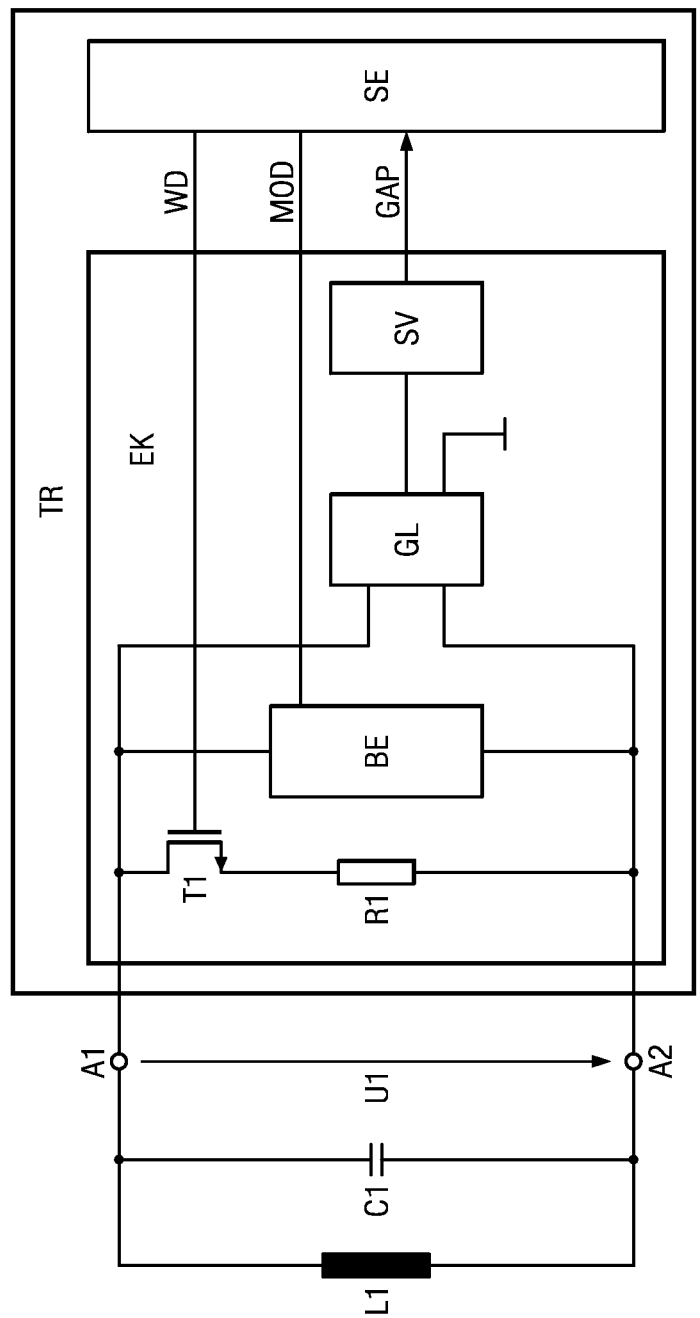
FIG. 1 illustrates a passive transponder with an input circuit for connecting an antenna coil for inductive coupling with a base station.

FIG. 1 shows a passive transponder TR in the form of an integrated circuit with an input circuit EK with input terminals A1 and A2 for connecting an antenna coil L1 for inductive coupling with a conventional base station (not shown).

A capacitor C1 is connected parallel to the antenna coil L1, whereby antenna coil L1 and capacitor C1 form a parallel resonant circuit whose resonance frequency is matched to a base station transmission frequency of 125 kHz. Antenna coil L1 forms a transformer coupling with an antenna coil (not shown) of the base station.

Input circuit EK of the transponder TR comprises a controllable voltage limiting unit BE as part of a modulation unit (not shown further), which is used for data transmission from transponder TR to base station by means of load modulation.

A switching element in the form of a MOS transistor T1 and a resistor R1 are looped serially between the input terminals A1 and A2 of the input circuit EK.

An alternating voltage U1 applied at the input terminals A1 and A2 supplies a rectifier GL of the input circuit EK, which generates a supply voltage for the transponder TR. The rectified input voltage is supplied to a signal processing unit SV of the input circuit EK for field gap detection.

Transponder TR comprises furthermore a controller SE for controlling the transponder functions, which can be realized as a microprocessor or as a state machine. Controller SE generates a drive signal WD for transistor T1 and a drive signal MOD for voltage limiting unit BE, and receives a field gap detection signal GAP from the signal processing unit SV.

Figure 2:
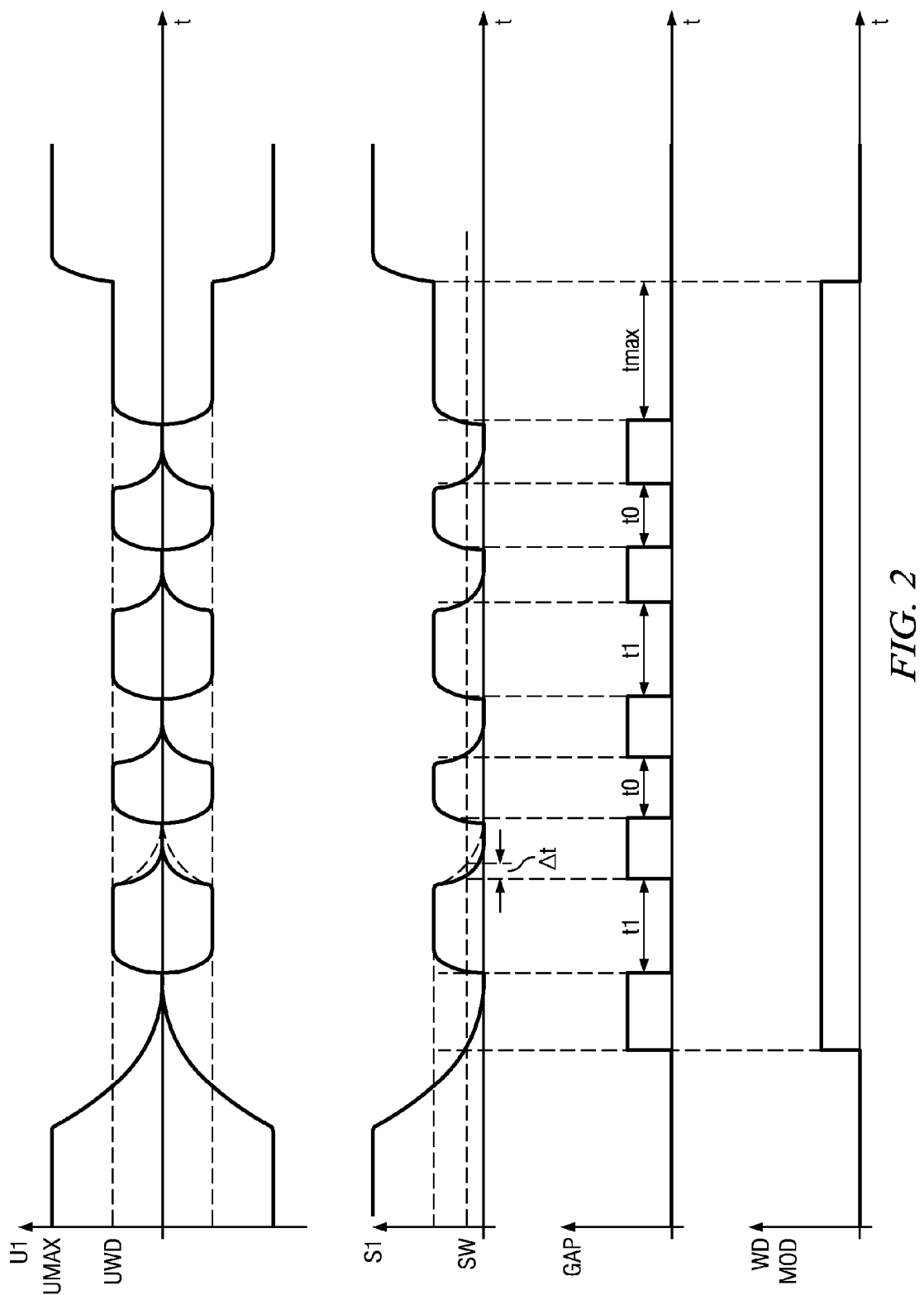
FIG. 2 is a timing diagram during a data transmission from a base station to the transponder of FIG. 1.

FIG. 2 shows a timing diagram during data transmission from a base station to the transponder of FIG. 1. Only the envelope curve is shown for the voltage U1. The rectified voltage U1 is shown as signal S1 again as an envelope curve. The field gap detection signal GAP or the transistor drive signals WD and MOD are shown in the two lower diagrams. In the case of data receipt from the base station, the signals WD and MOD can have identical time courses.

Before the data transmission, the base station by means of its antenna coils generates a magnetic alternating field with a frequency of 125 kHz, which owing to the inductive coupling induces the alternating voltage U1 between the input terminals A1 and A2. An amplitude of the alternating voltage U1 is limited or clamped to a maximum voltage UMAX by the voltage limiting unit BE.

To initiate the data transmission within the scope of a write access operation to the transponder TR, the base station generates a field gap or a gap by suppressing the carrier signal. The voltage U1 of the parallel resonant circuit declines depending on its quality only slowly along the envelope curve. The course of the rectified voltage U1 is evaluated in the signal processing unit SV. When the voltage U1 falls below a threshold value SW for the first time, the signal processing unit SV generates an active signal GAP, i.e., indicates the detected field gap to the controller SE.

Controller SE thereupon activates the signals MOD and WD, i.e., the transistor T1 is connected through or turned on. The through-connected transistor T1 causes a resistive load in the form of resistor R1 between the input terminals A1 and A2 to be connected, as a result of which the quality of the resonant circuit is reduced or its damping increased. This causes the envelope curve of voltage U1 in the case of a field gap to decrease much more rapidly; i.e., subsequent field gaps can be detected with a much smaller delay.

This is shown by way of example for the second field gap, here the signal course with the lower damping, i.e., without a connected resistor R1, is shown by the dashed line. As is evident from FIG. 2, until the detection of the field gap, a time difference Δt arises between the conventional, undamped signal course and the more greatly damped signal course of the invention. The signal course of the invention therefore corresponds much better to an ideal signal course, in which the voltage U1 or the signal S1 in the case of a field gap declines abruptly, as a result of which it is possible to detect the field gap without delay.

The resonant circuit damping is hereby determined substantially by the value of the resistor R1, i.e., the portions caused by antenna coil L1 and capacitor C1 are negligible. The timing of the signal received by the transponder after the detection of the first field gap is therefore independent of the quality of antenna coil L1 and of capacitor C1, i.e., the base station can generate its transmitting signal regardless of timing or of which antenna coil type is used in the transponder.

The voltage limiting unit BE, driven by the active modulation signal MOD, causes the voltage U1 to be limited or clamped to a value UWD. The voltage reduction of the voltage U1 to the maximum voltage value UWD also produces a more rapid detectability of a field gap, because voltage U1 declines from a lower starting value to the threshold value SW.

After the initiation of the data transmission by generation of the first field gap, the base station again turns on its carrier signal. Owing to the activated modulation signal MOD, the voltage limiting unit BE limits the voltage U1 to the value UWD. Characters which are transmitted subsequent to the initiation of the data transmission by the base station are encoded by the associated durations t0 or t1 between temporally successive field gaps. A first character value "0" is hereby assigned the duration t0 and a second character value "1" the duration t1. To decode the transmitted characters, the transponder TR determines the specific durations t0 or t1 between the field gaps and determines the value of the transmitted character from the determined duration. In the shown case, the exemplary binary character sequence "1010" is transmitted to the transponder.

When the base station has transmitted the desired number of characters, it then no longer generates any field gaps. When a maximum duration tmax has elapsed since the last field gap (i.e., the voltage U1 applied at the input terminals A1, A2 is above the first threshold value SW for the duration tmax), the transponder TR detects the end of the data transmission. It thereupon deactivates the signals WD and MOD. This causes, on the one hand, an increase in the quality of the input resonant circuit and, on the other, an increase in the maximum value of the voltage U1 to the value UMAX, because the voltage limiting unit BE owing to the deactivated signal MOD limits the voltage U1 to the maximum value UMAX. To detect whether the data transmission has ended, it is also possible to use another, for example, higher threshold value (not shown) instead of the threshold value SW, whereby it is then checked accordingly whether the voltage U1 is above this threshold value for the maximum duration tmax.

The shown embodiments enable a high transmission range between base station and transponder due to the high settable quality of the input resonant circuit comprising an antenna coil L1 and capacitor C1 and simultaneously a substantially quality-independent timing of the signals generated by the base station.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A transponder comprising:
    a circuit comprising two antenna terminals coupled to respective ends of an antenna coil for receiving data by inductive coupling;
    a resistor coupled in series with a switch between the terminals; and
    a controller configured to:
        couple the terminals to the resistor through the switch when detecting that a voltage applied at the terminals falls below a first threshold value; and
        decouple the terminals from the resistor through the switch when detecting that the voltage applied at the terminals is higher than a second threshold value for a duration.

2. The transponder of claim 1, further comprising a signal-processing unit configured to transmit a signal to the controller in response to detecting the voltage falling below the first threshold value, the signal indicating detection of a field gap in the received data.

3. The transponder of claim 1, wherein the circuit is configured to process frequencies within a frequency range of approximately 50 kHz to approximately 250 kHz.

4. The transponder of claim 1, further comprising a voltage-limiting unit configured to limit the voltage applied at the terminals to a maximum value.

5. The transponder of claim 4, wherein the controller is further configured to deactivate the voltage-limiting unit in response to the voltage applied at the terminals being higher than the second threshold value.

6. The transponder of claim 1, wherein coupling the resistor to the terminals determines a damping of a resonant circuit.

7. The transponder of claim 1, wherein the first threshold value is the same as the second threshold value.

8. The transponder of claim 1, wherein the first and second thresholds are different, the second threshold value being higher than the first threshold value.

9. A method comprising:
    interfacing, by a transponder, with a base station through inductive coupling to receive data, the transponder comprising a circuit with two antenna terminals coupled to respective ends of an antenna coil and a resistor coupled in series with a switch between the terminals; and
    coupling, when detecting that a voltage applied at the terminals falls below a first threshold value, the terminals to the resistor through the switch;
    decoupling, when detecting that the voltage applied at the terminals is higher than a second threshold value for a duration, the terminals from the resistor through the switch.

10. The method of claim 9, further comprising transmitting a signal from a signal-processing unit to a controller in response to detecting the voltage applied at the terminals falling below the first threshold value, the signal indicating detection of a field gap in the received data.

11. The method of claim 9, wherein the transponder is configured to process frequencies within a frequency range of approximately 50 kHz to approximately 250 kHz.

12. The method of claim 9, further comprising:

limiting the voltage applied at the terminals to a maximum value through a voltage-limiting unit; and deactivating the voltage-limiting unit in response to the voltage applied at the terminals being higher than the second threshold value.

13. The method of claim 9, wherein coupling the resistor to the terminals determines a damping of a resonant circuit.

14. The method of claim 9, wherein the first threshold value is the same as the second threshold value.

15. The method of claim 9, wherein the first and second thresholds are different, the second threshold value being higher than the first threshold value.

16. A device comprising:

a circuit comprising two antenna terminals coupled to respective ends of an antenna coil for receiving data by inductive coupling;

a rectifier coupled to the terminals configured to generate a signal based on a voltage applied at the terminals;

a signal-processing unit configured to detect a field gap based on the signal from the rectifier;

a resistor coupled in series with a switch between the terminals; and a controller configured to:

couple the terminals to the resistor through the switch when detecting, based on the generated signal, that the voltage applied at the terminals falls below a first threshold value; and decouple the terminals from the resistor through the switch when detecting that the voltage applied at the terminals is higher than a second threshold value for a duration.

17. The device of claim 16, wherein the signal-processing unit is further configured to transmit a signal to the controller in response to the voltage applied at the terminals falling below the first threshold value, the signal indicating detection of the field gap in the received data.

18. The device of claim 16, wherein:

the device further comprises a voltage-limiting unit configured to limit the voltage applied at the terminals to a maximum value; and the controller is further configured to deactivate the voltage-limiting unit in response to the voltage applied at the terminals being higher than the second threshold value.

19. The device of claim 16, wherein the first threshold value is the same as the second threshold value.

20. The device of claim 16, wherein the first and second thresholds are different, the second threshold value being higher than the first threshold value.

* * * * *